United States Patent
O'Reilly et al.

(10) Patent No.: US 11,900,827 B2
(45) Date of Patent: Feb. 13, 2024

(54) AUTOMATICALLY MODIFYING DISPLAY PRESENTATIONS TO PROGRAMMATICALLY ACCOMMODATE FOR VISUAL IMPAIRMENTS

(71) Applicant: Optum Services (Ireland) Limited, Dublin (IE)

(72) Inventors: Sarah Noreen O'Reilly, Dublin (IE); Michael Keane, Kildare (IE); Gareth M. Crossan, Dublin (IE); Patrick G. Mooney, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 17/817,046

(22) Filed: Aug. 3, 2022

(65) Prior Publication Data

US 2022/0375367 A1 Nov. 24, 2022

Related U.S. Application Data

(63) Continuation of application No. 16/936,604, filed on Jul. 23, 2020, now Pat. No. 11,482,133.

(60) Provisional application No. 62/895,653, filed on Sep. 4, 2019.

(51) Int. Cl.
*G09B 21/00* (2006.01)
*G06N 20/00* (2019.01)
*G06F 3/04847* (2022.01)
*G06F 3/048* (2013.01)

(52) U.S. Cl.
CPC ....... *G09B 21/008* (2013.01); *G06F 3/04847* (2013.01); *G06N 20/00* (2019.01)

(58) Field of Classification Search
CPC ...... G09B 21/008; G09B 21/00; G06N 20/00; G06N 20/20; G06F 3/04847; G06F 3/048; G06F 3/0484
USPC ............................................... 348/61, 62, 63
See application file for complete search history.

(56) References Cited

U.S. PATENT DOCUMENTS

| | | | |
|---|---|---|---|
| 7,145,571 B2 | 12/2006 | Jones et al. | |
| 10,356,190 B2* | 7/2019 | Ravishankar | ......... H04L 67/146 |
| 11,045,340 B2 | 6/2021 | Sharma | |
| 11,048,488 B2 | 6/2021 | Martel et al. | |
| 11,361,218 B2* | 6/2022 | Rasch | ..................... G06N 3/065 |
| 2006/0290712 A1 | 12/2006 | Hong et al. | |
| 2007/0055938 A1 | 3/2007 | Herring et al. | |
| 2014/0282285 A1 | 9/2014 | Sadhvani et al. | |
| 2017/0316338 A1* | 11/2017 | Eshghi | .................. G06F 16/285 |
| 2020/0019418 A1* | 1/2020 | P K | .......................... G06F 17/18 |

(Continued)

OTHER PUBLICATIONS

"Blindness and Vision Impairment." World Health Organization, Oct. 8, 2020, (4 pages). [Article, Online]. [Retrieved from the Internet Oct. 18, 2020]<URL: https://www.who.int/en/news-room/fact-sheets/detail/blindness-and-visual-impairment>.

(Continued)

*Primary Examiner* — Daquan Zhao
(74) *Attorney, Agent, or Firm* — Alston & Bird LLP

(57) ABSTRACT

Methods, apparatus, systems, computing devices, computing entities, and/or the like for identifying one or more visual impairments of a user, mapping the visual impairments to one or more accessibility solutions, (e.g., program code entries) and dynamically modifying a display presentation based at least in part on the identified accessibility solutions.

6 Claims, 14 Drawing Sheets

(56) References Cited

U.S. PATENT DOCUMENTS

2020/0065903 A1* 2/2020 Rembert ............ G06Q 20/3223
2021/0065584 A1 3/2021 O'Reilly et al.

OTHER PUBLICATIONS

"Color Blindness." NIH—National Eye Institute, pp. 1-6. [Article, Online]. [Retrieved from the Internet Oct. 18, 2020]<URL: https://www.nei.nih.gov/learn-about-eye-health/eye-conditions-and-diseases/color-blindness>.
"Daltonize," May 18, 2010, pp. 1-12. [Article, Online]. [Retrieved from the Internet Oct. 18, 2020]<URL: http://www.daltonize.org/>.
"EyeXam on the App Store." Global EyeVentures, LLC, (3 pages). [Article, Online]. [Retrieved from the Internet Oct. 18, 2020]<URL: https://apps.apple.com/us/app/eyexam/id357290178>.
"Pocket Eye Exam." NOMAD, (3 pages). [Article, Online]. [Retrieved from the Internet Oct. 18, 2020]<URL:https://apps.apple.com/us/app/pocket-eye-exam/id438835010>.
"Software for Colorblind People—You Can See The World Colorfully!" Dalton, (4 pages). [Article, Online]. [Retrieved from the Internet Jul. 11, 2018] <URL: http://colorblind.tech/>.
"Test Your Vision—Essilor Group." Essilor, (2015), (2 pages). [Article, Online]. [Retrieved from the Internet Oct. 18, 2020]<URL: https://www.essilor.com/en/vision-tests/test-your-vision/>.
"Web Content Accessibility Guidelines (WCAG) 2.0." W3C Recommendation, Dec. 11, 2008, pp. 1-29. [Article, Online]. [Retrieved from the Internet Oct. 18, 2020]<URL: https://www.w3.org/TR/WCAG20/>.
"What Is Visolve." Visolve, (1 page). [Article, Online]. [Retrieved from the Internet Oct. 18, 2020]<URL: http://www.ryobi-sol.co.jp/visolve/en/visolve.html>.

* cited by examiner

| Color blindness code | GUID | Description | Solution |
|---|---|---|---|
| CBR | 1807a66aff684ef3accfaa3278ce1ccd | turn text green | $("p").css("color", "green") |
| CBG | 86854c3367d54729996f7ba0e02e03ae | turn text red | $("p").css("color", "red") |
| CBB | 742e82c926854eac924530f7daf80681 | turn text black | $("p").css("color", "black") |

| Perceiving code | GUID | Description | Solution |
|---|---|---|---|
| PCS | 1807a66aff684ef3accfaa3278ce1ccd | make text bigger | $("p").css("Fontsize", "7") |
| PCB | 52012d7b36b74c6989e6b9dff098bdac | make text smaller | $("p").css("Fontsize", "1") |
| PCF | 2322b2af36ff48c1ac451d76c4373176 | change text font face | $("p").css("Fonttype", "serif") |

```
...
<p>
<font face="verdana" font size="3" color="red">
"This is text in a paragraph."
</p>
<p>
<font face="verdana" font size="6" color="green">
"This is text in a different paragraph."
</p>
...
```

FIG. 10A

```
...
<p>
<font face="verdana" font size="10" color="green">
"This is text in a paragraph."
</p>
<p>
<font face="verdana" font size="10" color="green">
"This is text in a different paragraph."
</p>
...
```

FIG. 10B

AUTOMATICALLY MODIFYING DISPLAY PRESENTATIONS TO PROGRAMMATICALLY ACCOMMODATE FOR VISUAL IMPAIRMENTS

CROSS REFERENCE TO RELATED APPLICATIONS

This application is a continuation of U.S. application Ser. No. 16/936,604 filed Jul. 23, 2020, which claims priority to U.S. Application No. 62/895,653 filed Sep. 4, 2019, the contents of which are incorporated herein in its entirety.

TECHNOLOGICAL FIELD

Embodiments of the present invention generally relate to systems and methods for identifying visual impairments of an individual, identifying corresponding accessibility solutions for the visual impairments and modifying display presentations (e.g., user interfaces) to accommodate for the visual impairments.

BACKGROUND

Visual impairment is a broad term that encompasses eye conditions such as visual acuity, color blindness, double vision, stereopsis and other conditions. People with low or moderate visual impairment may find it difficult to interact with content on user interfaces (e.g., webpages). This may be due to content accessibility issues, such as small text or focus indicators that are hard to see.

Presently, providing accessible content requires engineers and developers to identify and resolve content accessibility issues. For example, website accessibility issues are resolved generically by following accessibility guidelines such as the 12 Web Content Accessibility Guidelines WCAG 2.0 and its 65 checkpoints. Testing and developing solutions for content presented on user interfaces is time-consuming and challenging due to the number and complexity of these guidelines and the profusion and variation of user requirements. Implemented solutions may become obsolete or not perform as anticipated. Furthermore, such accessibility solutions are not customized for the specific requirements of individuals.

Accordingly, there is a latent need for systems and methods for making content more accessible by dynamically modifying the presentation of such content on displays based, at least in part, on individual requirements. There is also a need for systems and methods which can be updated easily with revised guidance and up-to-date information. Some examples of these solutions are described in detail herein.

BRIEF SUMMARY

In general, embodiments of the present invention provide methods, apparatus, systems, computing devices, computing entities, and/or the like.

In accordance with one aspect, a method for dynamically modifying a display presentation is provided. In one embodiment, the method comprises, responsive to a user initiating an internet browser, generating, by the internet browser, a request for determined program code entry, wherein (a) the request comprises a program code identifier, (b) the program code identifier is used by a server to identify determined program code entry corresponding to the program code identifier, (c) the determined program code entry is configured to dynamically modify a webpage document using one or more scripts; receiving, by the internet browser, a response to the request, wherein (a) the request comprises the program code identifier, and (b) the response comprises the determined program code entry; storing, by the internet browser, the determined program code entry; receiving, by the internet browser, a webpage document, wherein the webpage document originates from a web server; executing, by the internet browser and based at least in part on the determined program code entry, one or more scripts on the received webpage document to generate a modified webpage document; and providing, by the internet browser, the modified webpage document for display.

In accordance with another aspect, a computer program product is provided. The computer program product may comprise a non-transitory computer readable medium having computer program instructions stored therein. The computer program instructions when executed by a processor, cause an internet browser to, responsive to a user initiating an internet browser, generate a request for determined program code entry, wherein (a) the request comprises a program code identifier, (b) the program code identifier is used by a server to identify determined program code entry corresponding to the program code identifier, (c) the determined program code entry is configured to dynamically modify a webpage document using one or more scripts; receive a response to the request, wherein (a) the request comprises the program code identifier, and (b) the response comprises the determined program code entry; store the determined program code entry; receive a webpage document, wherein the webpage document originates from a web server; execute, based at least in part on the determined program code entry, one or more scripts on the received webpage document to generate a modified webpage document; and provide the modified webpage document for display.

In accordance with yet another aspect, an apparatus comprising a non-transitory computer readable storage medium and one or more processors is provided. The apparatus may be configured, via an internet browser, to, responsive to a user initiating an internet browser, generate a request for determined program code entry, wherein (a) the request comprises a program code identifier, (b) the program code identifier is used by a server to identify determined program code entry corresponding to the program code identifier, (c) the determined program code entry is configured to dynamically modify a webpage document using one or more scripts; receive a response to the request, wherein (a) the request comprises the program code identifier, and (b) the response comprises the determined program code entry; store the determined program code entry; receive a webpage document, wherein the webpage document originates from a web server; execute, based at least in part on the determined program code entry, one or more scripts on the received webpage document to generate a modified webpage document; and provide the modified webpage document for display.

BRIEF DESCRIPTION OF THE SEVERAL VIEWS OF THE DRAWINGS

Figure 1:
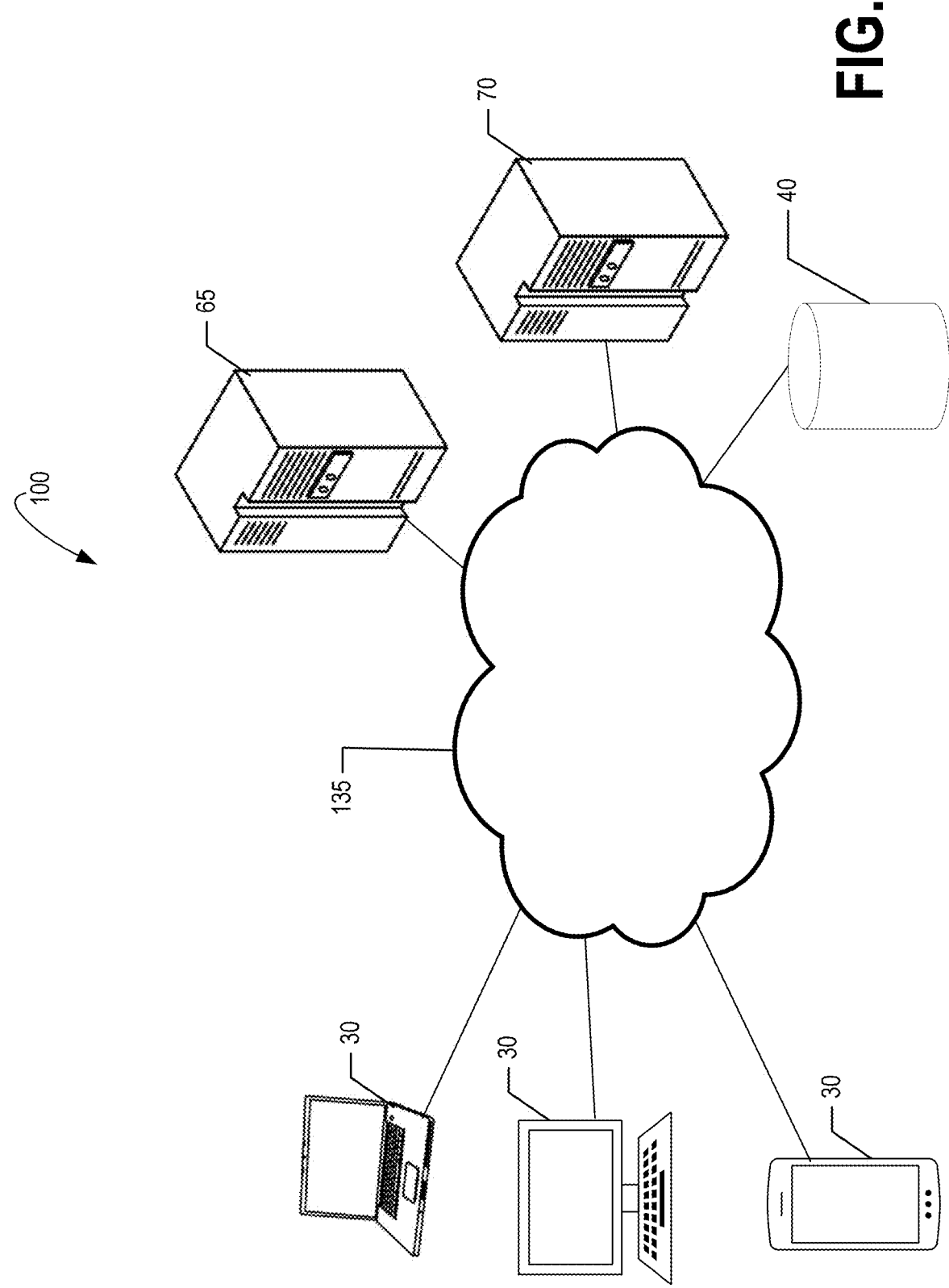
Figure 2:
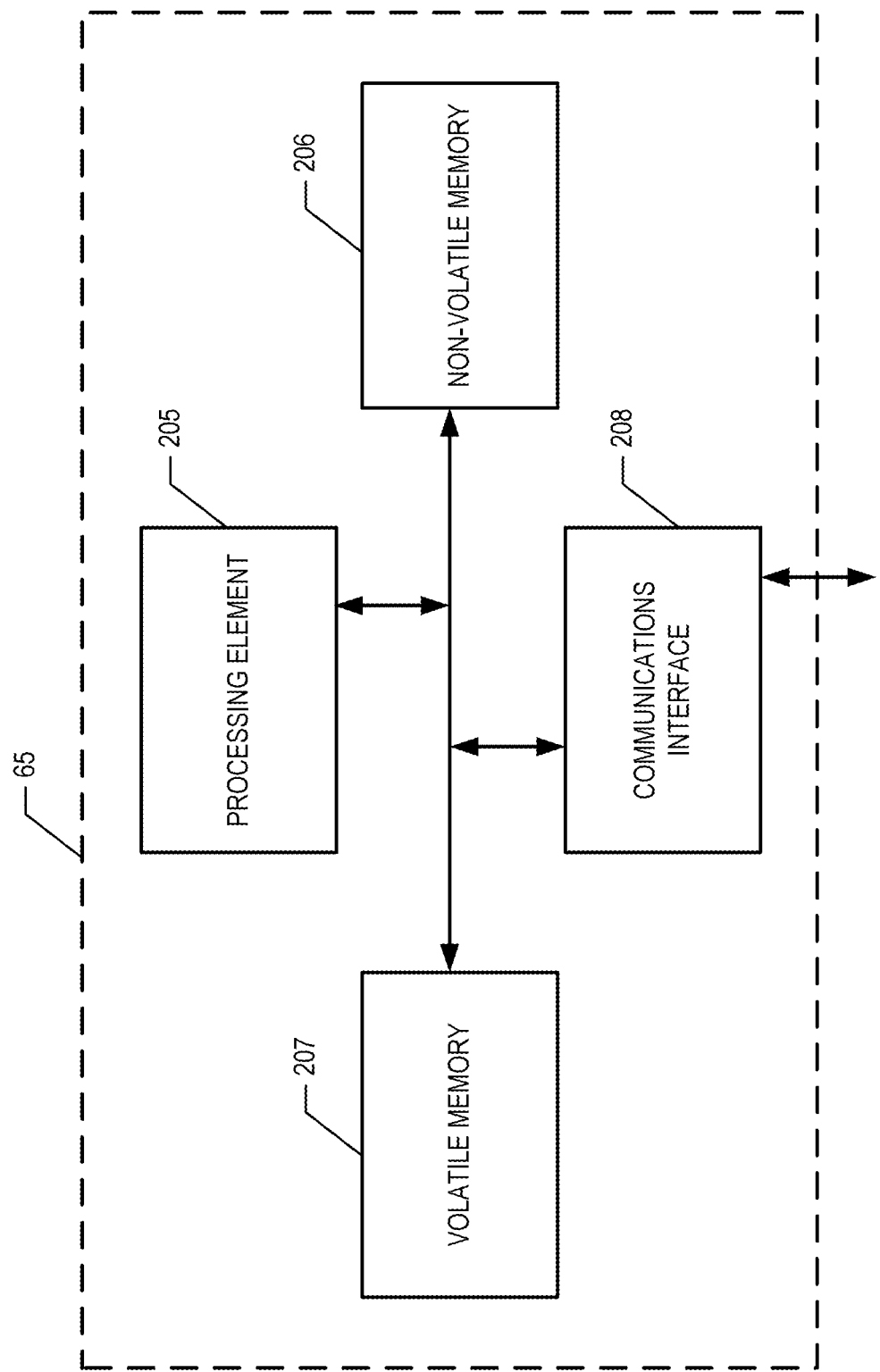
Figure 3:
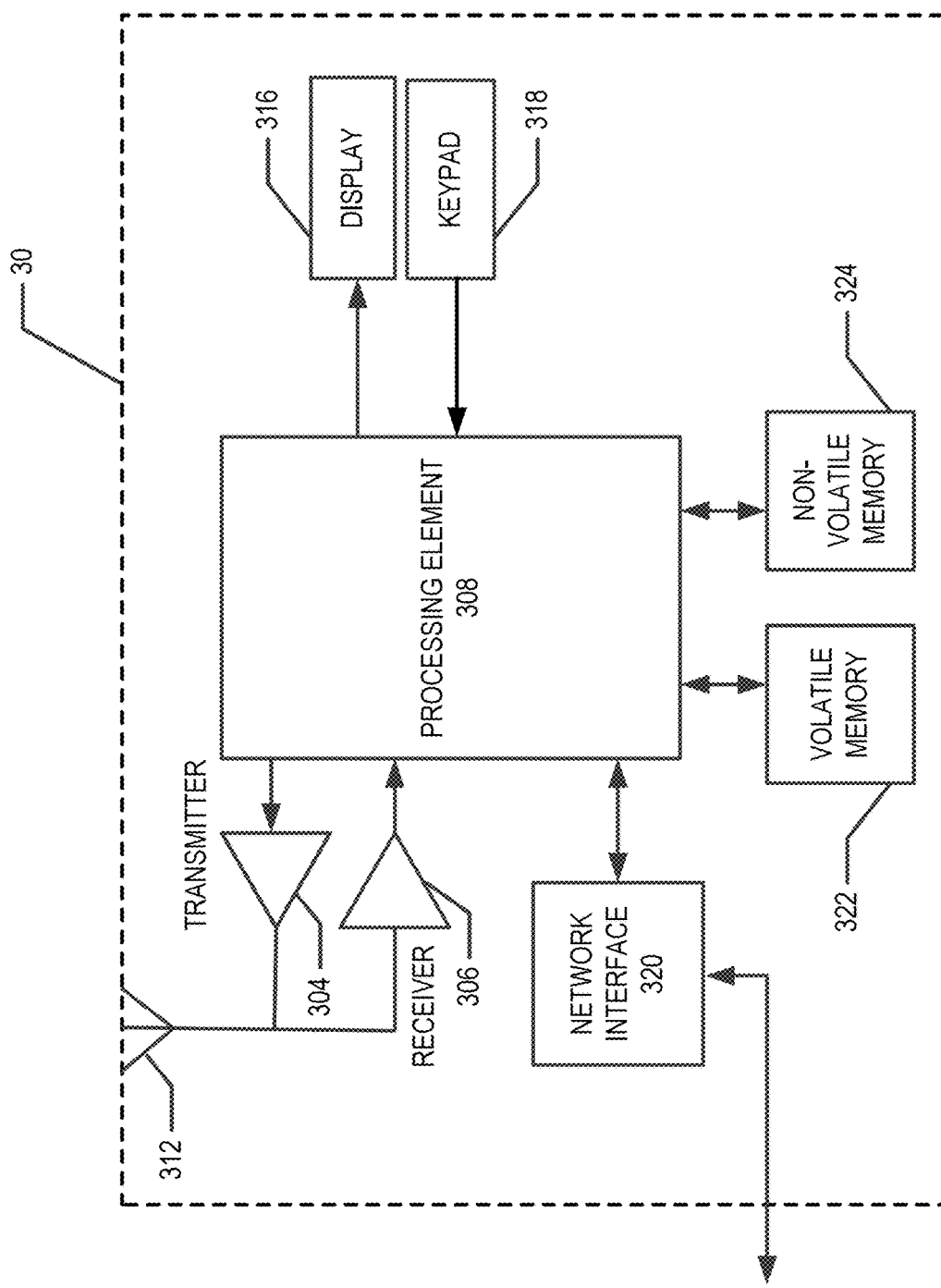
Figure 4:
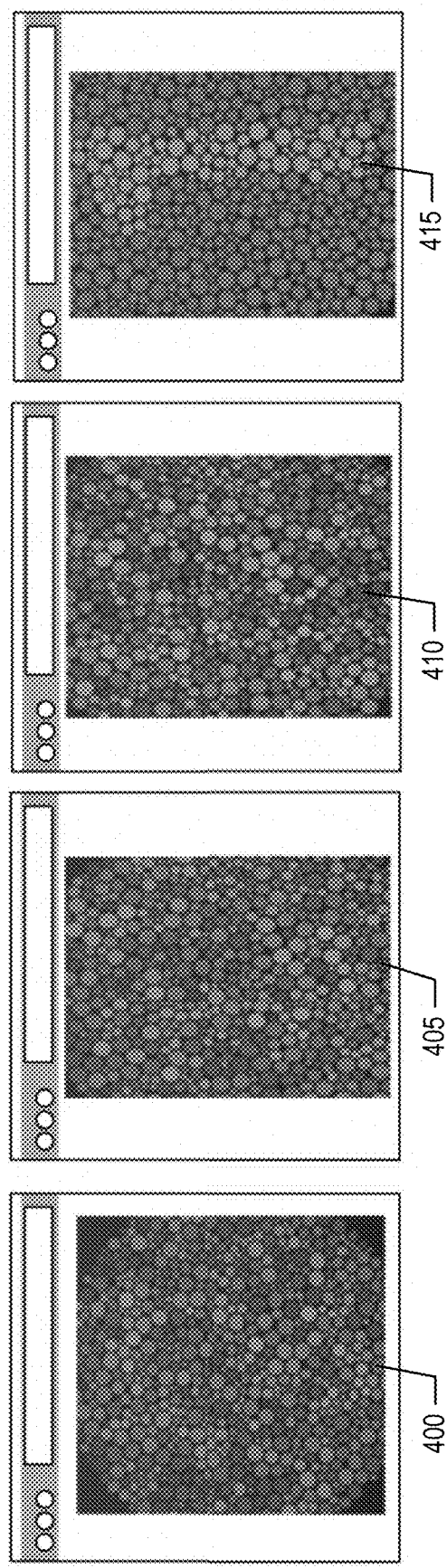
Figure 6B:
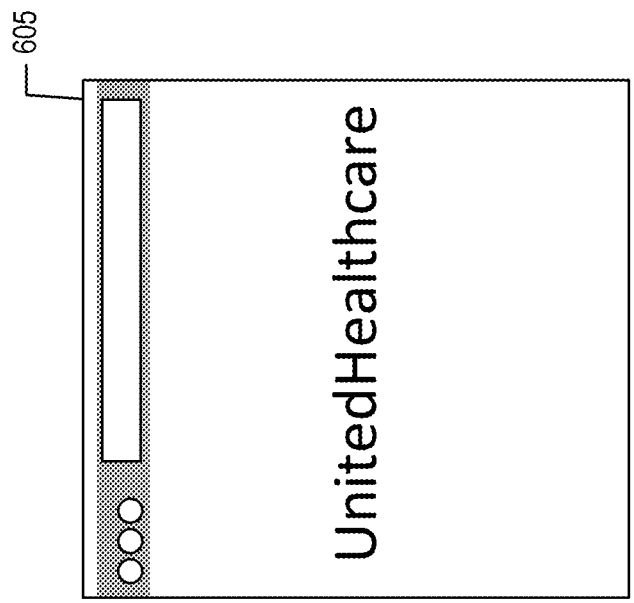
Figure 6A:
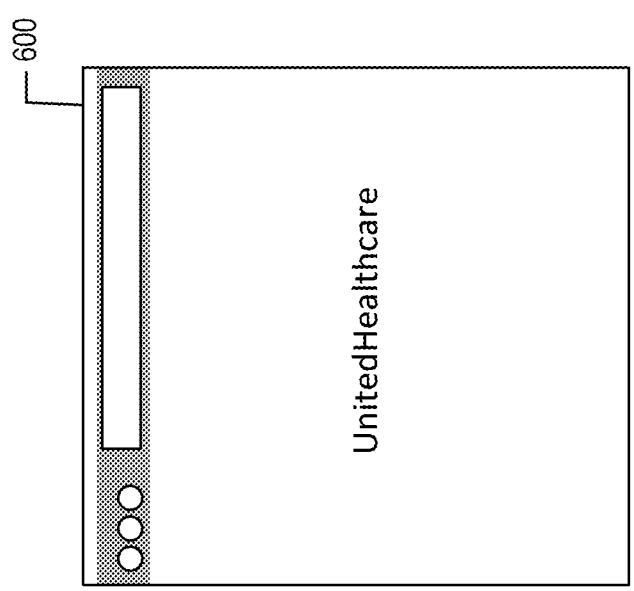
Figure 7B:
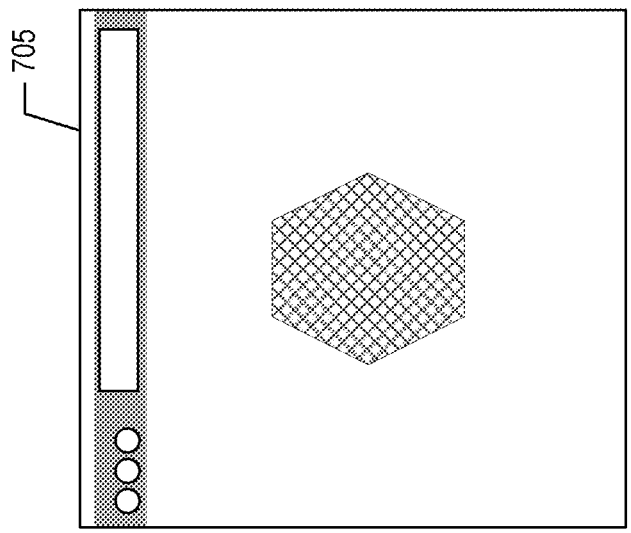
Figure 7A:
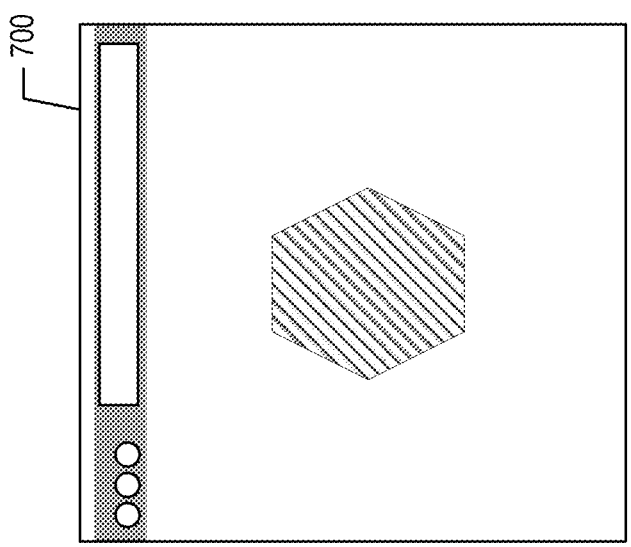
Figure 8A:
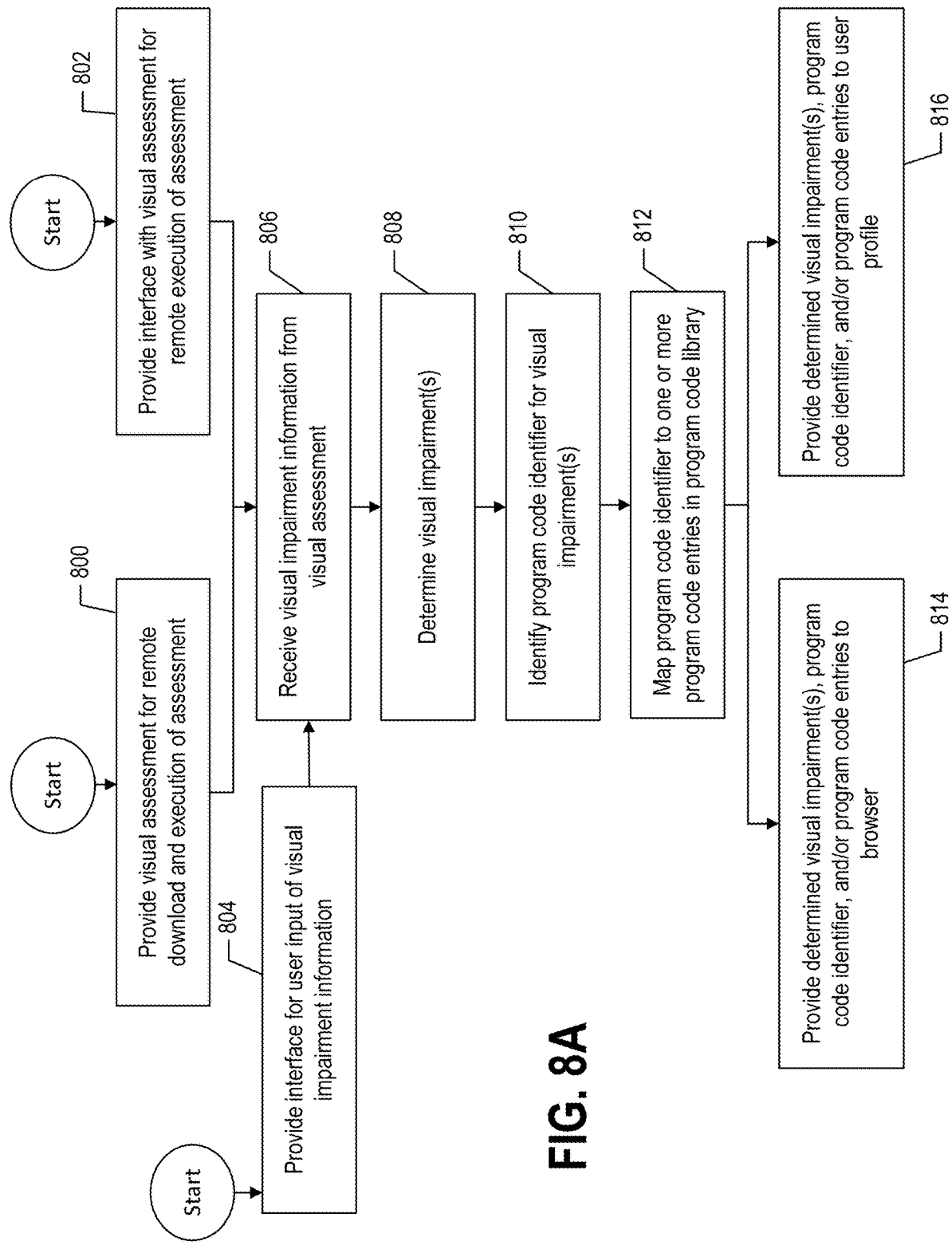
Figure 8B:
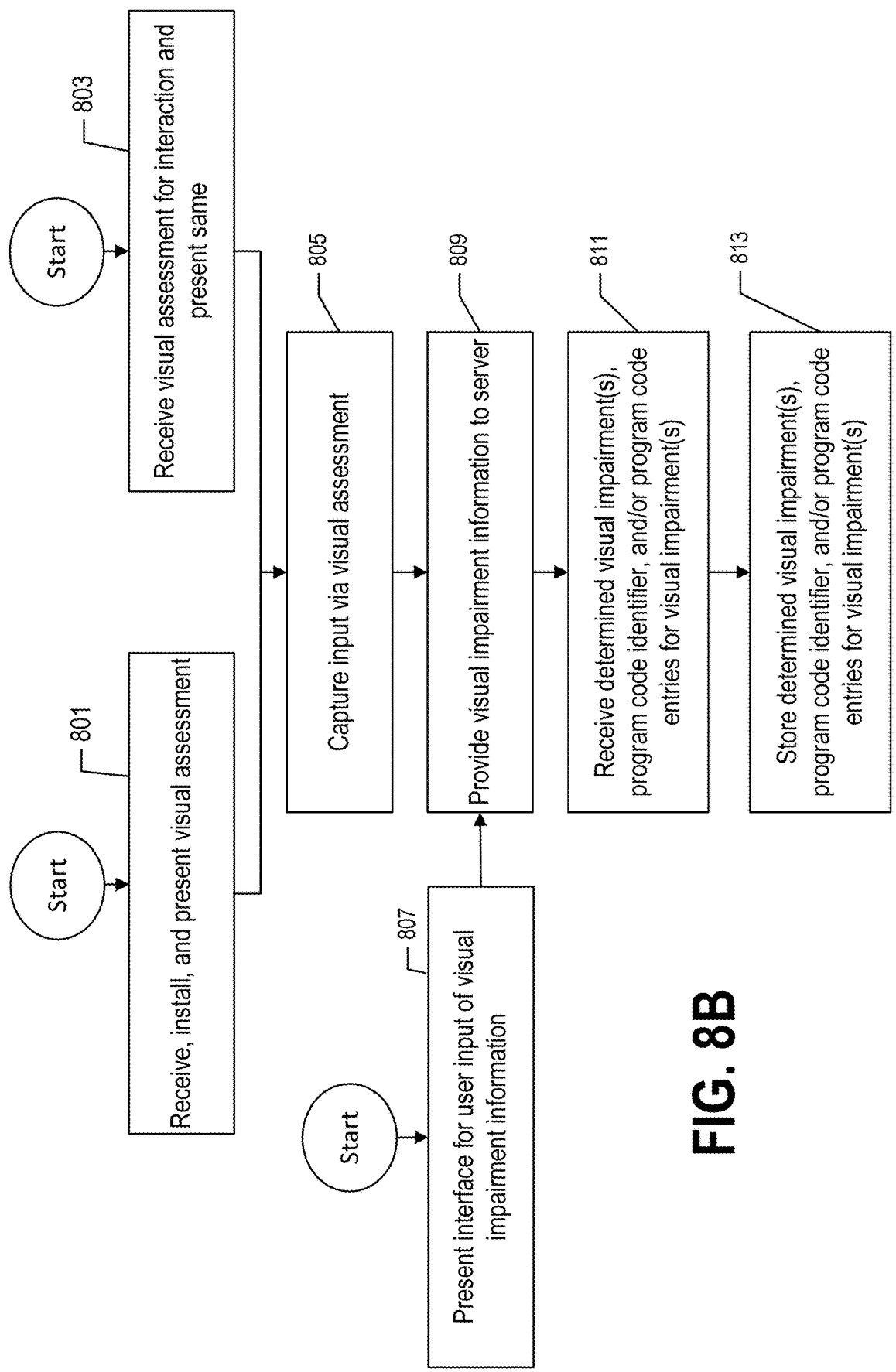
Figure 9A:
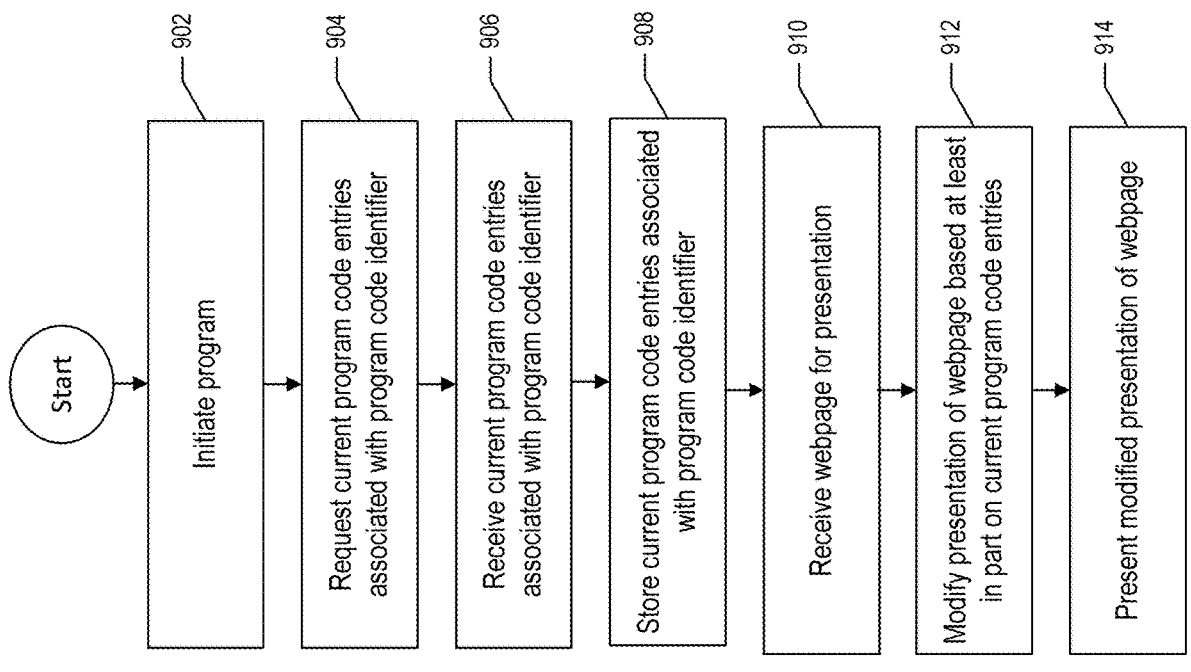
Figure 9B:
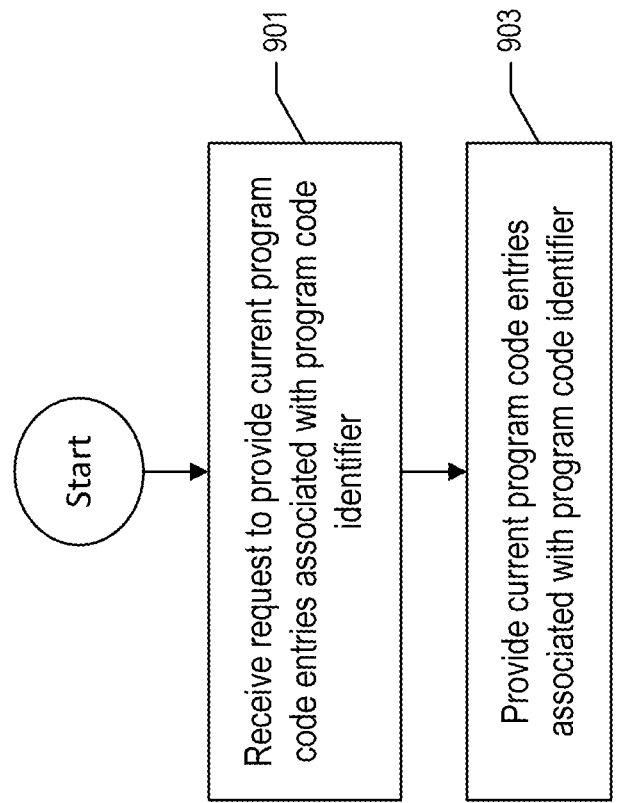
Figure 11A:
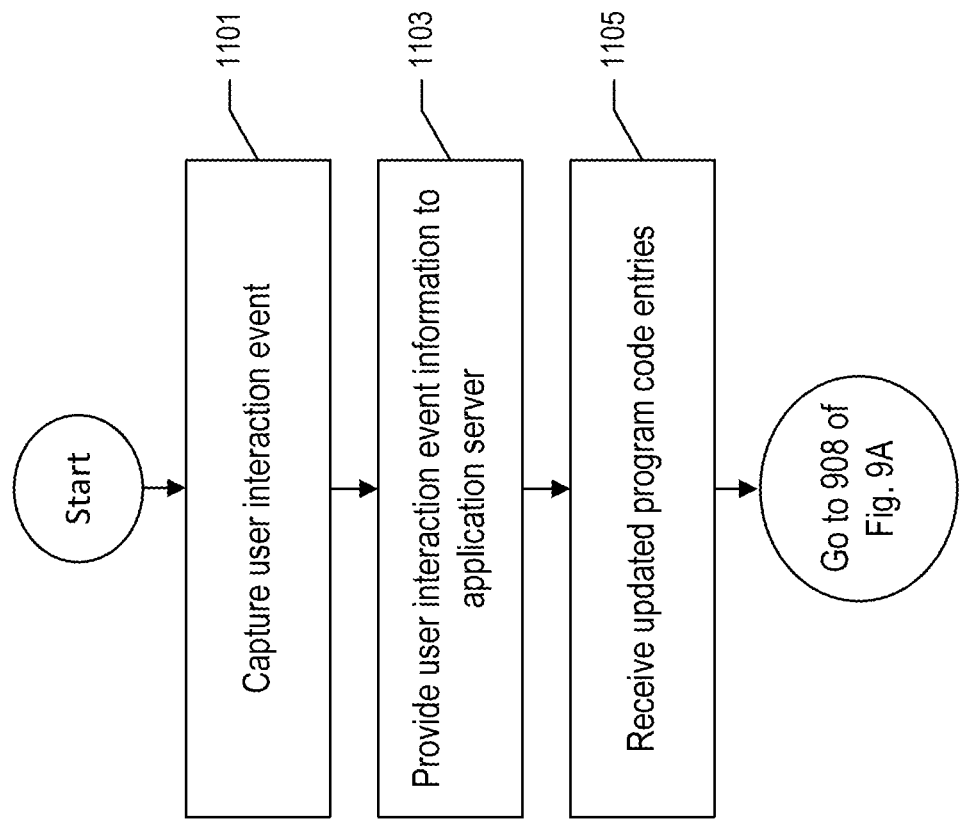
Figure 11B:
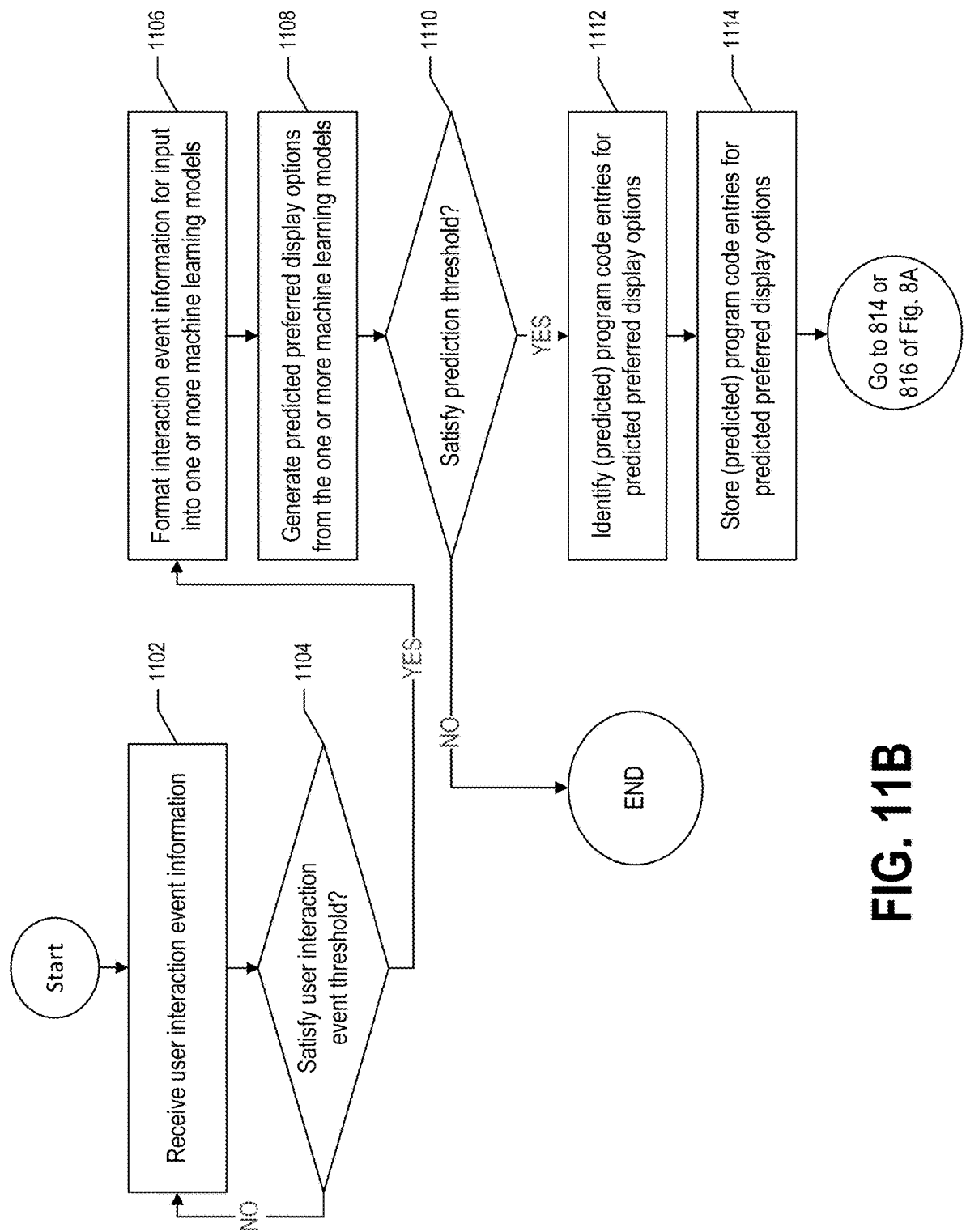

Having thus described the invention in general terms, reference will now be made to the accompanying drawings, which are not necessarily drawn to scale, and wherein:

FIG. 1 is a diagram of a system that can be used in conjunction with various embodiments of the present invention;

FIG. 2 is a schematic of an application server in accordance with certain embodiments of the present invention;

FIG. 3 is a schematic of a user computing device in accordance with certain embodiments of the present invention;

FIG. 4 illustrates exemplary visual assessment instances in accordance with certain embodiments of the present invention;

FIGS. 5A-5B illustrate exemplary entries in accordance with certain embodiments of the present invention;

FIGS. 6A-6B illustrate how the presentation of text may be modified in accordance with certain embodiments of the present invention;

FIGS. 7A-7B illustrate how the presentation of images may be modified in accordance with certain embodiments of the present invention;

FIGS. 8A-8B are flowcharts for exemplary operations, steps, and processes in accordance with certain embodiments of the present invention;

FIGS. 9A-9B are flowcharts for exemplary operations, steps, and processes in accordance with certain embodiments of the present invention;

FIGS. 10A-10B are exemplary portions of code in accordance with certain embodiments of the present invention; and FIGS. 11A-11B are flowcharts for exemplary operations, steps, and processes in accordance with certain embodiments of the present invention.

DETAILED DESCRIPTION OF SOME EXAMPLE EMBODIMENTS

Various embodiments of the present invention will now be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Systems and methods for providing accessibility solutions for users with visual impairments are described herein. In an embodiment, the system may provide accessibility solutions for a user interface, (e.g., browser) on a user computing device. The user computing device may be a mobile phone, tablet or personal computer. Other types of user interfaces or computing devices may be provided. In an embodiment, the system may be or comprise one or more application servers, web servers and/or software applications. The system may also comprise a portion of the operating system on a user computing device (e.g., a system extension). An example system extension may modify the display configurations on a user computing device. The system may be enabled/disabled by the user or automatically activated by certain conditions, for instance when an application is initialized. The system may modify display configurations for a particular application or make universal modifications on the user computing device. The exemplary system may comprise a browser extension or plug-in configured to scan webpages and insert code to modify webpages received from the web server. Additionally, the system may be profile based, generating and maintaining a user profile comprising current visual impairment information. User profiles comprising visual impairment information/data may be stored on the user computing device, application server or another analytic computing entity in communication with the system.

FIG. 1 illustrates a system 100 that can be used in conjunction with various embodiments of the present invention. As shown, the system 100 may comprise one or more application servers 65, one or more web servers 70, one or more user computing devices 30, one or more networks 135, one or more databases 40, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), Wireless Local Area Network (WLAN), Wide Wide Area Networks (WWAN), satellite communications network, cellular or mobile network, Global Area Network (GAN) and/or the like. Additionally, while FIG. 1 illustrates certain system entities as separate, standalone entities, the various embodiments are not limited to this particular architecture.

a. Exemplary Application Server

FIG. 2 provides a schematic of an application server 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the application server 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the application server 65 may communicate with other servers, one or more web servers 70, one or more user computing devices 30, one or more databases 40, and/or the like.

As shown in FIG. 2, in one embodiment, the application server 65 may include or be in communication with one or more processing elements 205 (also referred to as processors, processing circuitry, and/or similar terms used herein interchangeably) that communicate with other elements within the application server 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the application server 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the relevancy prediction system may be stored. As a person of ordinary skill in the art would recognize, the information/data required for the operation of the relevancy prediction system may also be partially stored in the cloud data storage system and partially stored in a locally maintained data storage system.

Memory media 206 may include information/data accessed and stored by the system 100 to facilitate its operations. More specifically, memory media 206 may encompass one or more data stores configured to store information/data usable in certain embodiments.

In one embodiment, the application server 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the application server 65 with the assistance of the processing element 205 and operating system.

As indicated, in one embodiment, the application server 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the application server 65 may communicate with computing entities or communication interfaces of other computing entities, user computing devices 30, databases 40, and/or the like.

As indicated, in one embodiment, the application server 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the application server 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The application server 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the application server 65 components may be located remotely from other application server 65 components, such as in a distributed system. Furthermore, one or more of the components may be aggregated and additional components performing functions described herein may be included in the application server 65. Thus, the application server 65 can be adapted to accommodate a variety of needs and circumstances.

b. Exemplary User Computing Device

FIG. 3 provides an illustrative schematic representation of user computing device 30 that can be used in conjunction with embodiments of the present invention. As will be recognized, the user computing device may be operated by an agent and include components and features similar to those described in conjunction with the application server 65. Further, as shown in FIG. 3, the user computing device 30 may include additional components and features. For example, the user computing device 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an application server 65, a web server 70, another user computing device 30, a database 40, and/or the like. In this regard, the user computing device 30 may be capable of operating with one or more air interface standards, communication protocols, modulation types, and access types. More particularly, the user computing device 30 may operate in accordance with any of a number of wireless communication standards and protocols. In a particular embodiment, the user computing device 30 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing device 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing device 30 can also download changes, add-ons, and updates, for instance, to its firmware, software (e.g., including executable instructions, applications, program modules), and operating system.

According to one embodiment, the user computing device 30 may include location determining aspects, devices, modules, functionalities, and/or similar words used herein interchangeably. For example, the user computing device 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing device 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing device 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing device 30 to cause display or audible presentation of information/data and for user interaction therewith via one or more user input interfaces. The user output interface may be updated dynamically from communication with the application server 65. The user input interface can comprise any of a number of devices allowing the user computing device 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing device 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs, the user computing device 30 can collect information/data, user interaction information/data for user interaction events/inputs, and/or the like.

The user computing device 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing device 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Reference will now be made to FIGS. 4, 5A, 5B, 6A, 6B, 7A, 7B, 8A, 8B, 9A, 9B, 10A, 10B, 11A, and 11B. FIG. 4 illustrates exemplary visual assessment instances. FIG. 5A-5B illustrate exemplary database tables. FIGS. 6A-6B illustrate how text may be modified in an exemplary user interface, and FIGS. 7A-7B illustrate how images may be modified in an exemplary user interface. FIGS. 8A, 8B, 9A, 9B, 11A, and 11B are flowcharts for exemplary operations, steps, and processes. FIGS. 10A-10B illustrate exemplary portions of code.

a. Technical Problems and Technical Solutions

1. Technical Problem

As previously noted, there is a latent need for systems and methods that can identify/determine the visual impairments of an individual and dynamically modify a display presentation (such as a user interface) with accessibility solutions corresponding to the determined visual impairments. For example, there are 253 million people living with visual impairments that may have difficulties interacting with and viewing content on user interfaces (e.g., webpages). Examples of visual impairments requiring modifications to display presentations for end users include low visual acuity, poor perception of contrast, color blindness, stereopsis, diplopia, and/or the like. A user with low visual acuity viewing text on a user interface, for instance, may require modifications to text size or text spacing. A user with poor perception of contrast viewing images on a user interface may require modifications to the background color to improve the contrast ratio. A user with color blindness (e.g., tritanopia, deuteranopia, protanopia or monochromacy) viewing images on a user interface may require modifications to the colors of text and/or images. As will be recognized, the disclosed approaches can be adapted to a variety of needs and circumstances.

Current methodologies for ensuring content accessibility are time-consuming to maintain and are not customizable to meet the requirements of individuals. The disclosed approaches provide customized accessibility solutions for the visual impairments of individuals that can be dynamically updated and work with any interface (e.g., browser). This disclosed solution is also lightweight requiring reduced computational requirements (resulting in increased computational speed and efficiency) and portable from one machine and/or application to another. It should be noted that while many of the examples provided are in the context of a browser implementation, embodiments of the invention are not so limited; rather, these examples are provided to aid in understanding the various embodiments.

2. Technical Solution

To overcome at least the above-identified technical challenges, visual assessments and/or user input can be used to determine the visual impairments of an individual. This visual impairment information/data can be mapped to the latest accessibility solutions and used to dynamically modify display presentations of content. The disclosed approaches provide a customized solution addressing the accessibility requirements of individuals that is simple to deploy and maintain, is less resource-intensive than existing solutions, and can be transparent to the user.

The disclosed approaches include concepts for programmatically determining/identifying an individual's visual impairments in an efficient manner, mapping the visual impairments to accessibility solutions corresponding to the visual impairments, and dynamically modifying a display presentation (e.g., user interface or other display) with up-to-date accessibility solutions. In exemplary embodiments, the system 100 may determine a user's visual impairments from one or more visual assessments and/or user input. The system 100 may identify a program code identifier for the visual impairments, map the program code identifier to one or more program code entries stored in a program code library (e.g., database) and provide the determined visual impairments, the program code identifier and/or program code entries to an end user's interface for modifying display presentations.

b. Identifying Visual Impairments

In various embodiments, a user's visual impairments may be determined by, for example, providing (e.g., sending or transmitting) one or more visual assessments for user interaction.

Starting at step/operation 800 in FIG. 8A, the application server 65, may provide (e.g., transmit, send) one or more visual assessments for download and execution on a user computing device 30. The visual assessment may comprise computer-executable program code provided via a user interface (e.g., a software application). The visual assessment may comprise computer games or interactive tests configured to determine the user's visual impairments. In various embodiments, the visual assessment may be a software application pre-installed on the user computing device 30 or downloaded via the network 135 from the application server 65, the web server 70, or another computing entity. In this example, the visual assessment may be a separate program or application for execution on a user computing device 30.

Alternatively, at step/operation 802 in FIG. 8A, the application server 65 may provide one or more visual assessments (e.g., remote execution) for interaction on the user computing device 30. For example, the user computing device may receive a visual assessment for presentation and interaction via a user interface, such as an internet browser that captures and transmits the user's responses/input to the application server 65 or other computing entity.

At step/operation 801 in FIG. 8B, the user computing device 30 may receive the visual assessment for installation and execution and interaction by the user. Alternatively, in another embodiment, the user computing device 30 may present, display, provide, and/or similar terms used herein interchangeably the user interface with the visual assessment via a browser for interaction by the user.

As illustrated in FIG. 4, visual assessment instances are represented as 400, 405, 410, 415 and may be provided for display via a user interface on the user computing device 30. The visual assessment instances 400, 405, 410, 415 may comprise hidden elements (e.g., numbers, letters or shapes) within patterns. As shown, the visual assessment instances 400, 405, 410, 415 may comprise images comprising hidden numbers within dotted patterns. The user may interact with the visual assessment instances 400, 405, 410, 415 through the user interface by, for example, providing input (e.g., using external input devices or via the user interface) and navigating the visual assessments. When presented with each image, for instance, the user may respond by identifying each hidden number, for example, by inputting the number when prompted or selecting the number from a set of corresponding elements provided via the user interface.

At step/operation 805 in FIG. 8B, as the user interacts with the visual assessment via the user computing device 30, the user computing device 30 may capture the input via the executed visual assessments. For example, a visual assessment to determine protanopia may comprise an image comprising small colored dots with a red number 1 hidden therein. When prompted to identify the hidden number via the user interface, if the user is unable to see the red number 1 and therefore selects an incorrect input element when prompted, the application server 65 may determine (from analyzing the information/data representing the user's response) that the user has protanopia.

In still another embodiment, at step/operation 804 of FIG. 8A, instead of or in addition to executing the visual assessments described above, an appropriate computing device may provide an interface for display to the user for manual input of visual impairment information. For example, the user may manually input text via the user interface indicating one or more known visual impairments. Additionally and/or alternatively, the user may supplement the visual assessments with additional information. In this embodiment, the user computing device 30 may present an interface, such as a browser, for the user input of the visual impairment information/data (step/operation 807 in FIG. 8B). For example, the user may identify or indicate a known visual impairments by selecting from a list, providing text, selecting a drop down or radio button, and/or the like. For instance, a user may input that he or she has deuteranomaly (the most common type of red-green color blindness).

At step/operation 809 in FIG. 8B, the user computing device 30 may provide (e.g., transmit, send) the visual impairment information/data (e.g., raw information/data from the visual assessment and/or manually inputted information) to the application server 65. In one embodiment, the visual impairment information/data comprises information/data captured from the visual assessment. In another embodiment, the visual impairment information/data comprises the manual input from the user identifying or indicating his or her visual impairment. The user computing device 30 may convert the visual impairment information/data into machine-readable information/data and transmit it to the application server 65 via the network 135. In some embodiments, the user computing device 30 may encrypt or deidentify the visual impairment information/data before transmission to protect the user's privacy.

As shown at step/operation 806 in FIG. 8A, the application server 65 may receive the visual impairment information/data (e.g., representing raw information/data from the visual assessment and/or manually inputted information) from the user computing device 30 via the network 135. At step/operation 808 in FIG. 8A, the application server 65 may determine the user's visual impairments by analyzing the received visual impairment information.

c. Identifying Accessibility Solutions
Corresponding with the Visual Impairments Referring to step/operation 810 in FIG. 8A, the application server 65 identifies one or more corresponding to one or more program code identifiers for the visual impairment (e.g., hexadecimal or alphanumeric strings). For example, if the determined visual impairment is deuteranomaly, the application server 65 may identify CBR or 86854c33676d54729996f7ba0e02e03ae as program code identifiers for the visual impairment. The one or more program code identifiers (elements 515A, 515B, 520A, 520B) for the visual impairment provide a way to map a visual impairment to program code entries that are deployable for remote execution, via for example, a browser extension or user profile.

As illustrated in FIG. 5A, program code identifier (e.g., identifier and/or GUID) may indicate a visual impairment and a corresponding program code entry. For example, as shown, the simple program code identifiers CBR, CGB and CBB (elements 515A, 520A) may indicate a particular visual impairment, such as a type of color blindness (e.g., protanopia or deuteranopia). The corresponding program code entries may comprise computer-executable instructions/code for modifying display presentations (e.g., identify and modify elements that are a certain color) corresponding to the program code identifier. As shown in FIG. 5B, the identifiers PCS, PCB and PCF (elements 515A, 520A) may indicate that the user has a particular visual impairment, such as a type of reduced visual acuity and cannot perceive text with certain characteristics. The corresponding program code entries may comprise computer-executable instructions/code for modifying display presentations (e.g., modify text to be larger or smaller and/or modify the font face/type) corresponding to the program code identifier.

As noted above, the program code identifiers may be simple (elements 515A, 515B) or more complex (elements 520A, 520B). The simple program code identifiers may be acronyms for particular visual impairments. For example, CBR may indicate color blindness red, which is associated with program code entries that change red pixels to green pixels. As will be recognized, a variety of naming conventions can be used to adapt to various needs and circumstances. For example, the complex program code identifiers (elements 520A, 520B) may be or comprise Globally Unique Identifiers (GUID) or Universally Unique Identifiers (UUID). For example, the program code identifier 1807a66aff684ef3accfaa3278ce1ccd may also identify one or more program code entries. In one embodiment, the complex program code identifiers (elements 520A, 520B) may be used to map to multiple program code entries. For example, program code identifier 1807a66aff684ef3accfaa3278ce1ccd is associated with a first program code entry that changes red pixels to green pixels and a second program code entry that changes font sizes smaller than 7 to 7. This allows the use of multiple changes for a given user. Moreover, the complex program code identifier may be a string that is unique to the user and identifies multiple program code entries (instead of just being unique to the program code entries). This allows for machine-learning driven changes based on user interaction events to be used to update the program code entries for a given user.

Thus, the application server 65 may use a single program code identifier to identify and provide multiple program code entries. For instance, with one or more program code identifiers, the application server 65 can query a program code library or database to retrieve any program code entries corresponding to the one or more program code identifiers. In some embodiments, the application server 65 may query a database, for example, using SQL select statements.

At step/operation 812 in FIG. 8A, the application server 65 may map the program code identifier (corresponding to the identified/determined visual impairments) to the program code entries stored in a program code library (e.g., one or more databases 40/repositories) and store the program code identifier in association with the program code entries or the program code entries in association with the program code identifier. The databases 40 may comprise a library of accessibility solutions for visual impairments. The program code entries may comprise computer-executable instructions or code suitable for modifying display presentations (e.g., webpages), including but not limited to user interfaces (e.g., browsers) and operating system interfaces. FIGS. 5A-5B illustrate exemplary entries comprises program code identifiers (515A, 515B, 520A, 520B), descriptions of the program code entries (525A, 525B), and the program code entries (530A, 530B). In one embodiment, the program code entries can be executed to programmatically modify a presentation. For example, one or more scripts executing via a browser can execute the program code entries to modify a presentation, such as a webpage, for display. Thus, a presentation, such as HyperText Markup Language (HTML) document/file/container, eXtensible HyperText Markup Language (XHTML) document/file/container, Scalable Vector Graphics (SVG) document/file/container, Cascading Style Sheets (CSS) document/file/container, combinations thereof and/or the like, may be automatically modified based at least in part on the one or more program code entries. For example, content (e.g., elements in the document/file/container) may be in HTML while styling of the content (e.g. layout, color, fonts) may be in CSS. The content (e.g., elements) may be grouped and/or defined using HTML tags, IDs and/or classes. Accordingly, one or more program code entries may be used to change (e.g., modify or replace) portions of code in the document. Similar, for an image document/file/container, one or more program code entries can be used to change individual pixels in the image, for instance. As will be recognized, a variety of other approaches and techniques can be used to adapt to various needs and circumstances.

Further, the program code entries stored in the program code library may be updated periodically and/or automatically based at least in part on updated medical information, with new or amended program code entries, information/data from content accessibility standards and/or the like. The program code entries may be automatically updated using external sources, may be modified based at least in part on user input, may be modified based at least in part on detected interaction using artificial intelligence, and/or the like.

At step/operation 814 in FIG. 8A, the application server 65 may provide the visual impairment information, the program code identifiers, and/or the program code entries to an end user browser (e.g., via a browser extension). Additionally or alternatively, at step/operation 816 in FIG. 8A, the application server 65 may provide the visual impairment information, the program code identifiers, and/or the program code entries to a user profile (e.g., native to the internet browser). In various embodiments, the user profile may comprise user profile information/data, such as a user identifier configured to uniquely identify the user, a username, user contact information/data (e.g., name, one or more electronic addresses such as emails, instant message usernames, social media user name, and/or the like), user preferences, user account information/data, user credentials, information/data identifying one or more user computing devices 30 corresponding to the user, and/or the like. Moreover, each user and/or user profile may correspond to a username, unique user identifier (e.g., 111111111), access credentials and/or the like. In one embodiment, the user identifier may be the program code identifier.

At step/operation 811 in FIG. 8B, the user computing device 30 may receive the determined visual impairments, the program code identifier, and/or the program code entries from the application server 65. Depending on the implementation, the determined visual impairments, the program code identifier, and/or the program code entries can be received by a browser extension, for example, or a user profile that is native to the internet browser.

At step/operation 813 in FIG. 8B, the user computing device 30 may store the determined visual impairments, the program code identifier, and/or the program code entries in association with the internet browser extension (or other application) and/or association with the user profile. The internet browser extension may periodically, continuously, or in response to certain triggers (e.g., user interaction events) update the program code entries by using an application programming interface (API) to generate and transmit a request to the application server 65 for the current program code entries corresponding to the program code identifier. In some embodiments, the internet browser extension, may only use the locally stored program code entries associated with the user profile until triggered or prompted to request an update from the application server 65. In some embodiments, the application server 65 may push updates to the internet browser extension or user profile when available. The user profile may be used to synchronize settings across a plurality of user computing devices 30 that are associated with the user profile.

d. End Use Execution

FIGS. 9A-9B are flowcharts for an exemplary browser implementation in accordance with various embodiments of the present invention.

At step/operation 902 in FIG. 9A, a user may initiate (e.g., via user interaction event) a browser executing on the user computing device 30 to request a webpage accessible via a Uniform Resource Locator (URL), initiate a search, or initiate (e.g., launch) an app in communication with a web server 70. The terms "browser," "interface," "app," and similar terms are used throughout interchangeably. In some embodiments, an extension may be executing as a lightweight program executing in a browser. As will be recognized, an extension is a lightweight software program that can customize the browsing experience, often built on web technologies such as HTML, JavaScript, and CSS. For instance, a Chrome extension may be zipped into a single-.crx package that the user downloads and installs. In a particular embodiment, the extension is built using a scripting language that can automatically and programmatically modify webpages.

Upon initiation, the internet browser, via the extension, can generate and transmit a request to the application server 65 for the current program code entries corresponding to the program code identifier. Thus, the API request comprises the program code identifier (step/operation 904 of FIG. 9A). The API response from the application server 65 comprises the program code entries (530A, 530B). Alternatively, a user profile native to the internet browser can generate and transmit a request to the application server 65 for the current program code entries corresponding to the program code identifier. In still another embodiment, the extension and/or user profile may already store the appropriate program code entries for execution.

At step/operation 901 in FIG. 9B, the application server 65 may receive the API request from the internet browser (e.g., via the internet browser extension or user profile) to provide the program code entries associated with the program code identifier and/or user/user profile. At step/operation 903 in FIG. 9B, the application server 65 may use the program code identifier in the request to identify one or more multiple program code entries. For instance, with one or more program code identifiers, the application server 65 can query a program code library or database to retrieve any program code entries corresponding to the one or more program code identifiers. In some embodiments, the application server 65 may query a database, for example, using SQL select statements. The query will return any program code entries corresponding to the program code identifier. Then, the application server 65 may provide the multiple program code entries via an API response.

Then, at step/operation 906 in FIG. 9A, the user computing device 30 may receive the current program code entries via the API response. At step/operation 908 in FIG. 9A, the program code entries may be stored on the user computing device 30 by, for example, the internet browser extension or the user profile. As will be recognized, requesting the current program code entries is not necessary upon initiation. Rather, the internet browser extension may use the locally stored program code entries unless it is triggered to request an update from the application server 65. The stored program code entries may be updated periodically, continuously, or in response to certain triggers with current program code entries from the application server 65. Regardless of the implementation, the internet browser (e.g., via the extension or the user profile) has the current program code entries that correspond to its stored program code identifier.

At step/operation 910 in FIG. 9A, the internet browser executing on the user computing device 30 may receive a requested webpage document (e.g., HTML document comprising computer-executable program code in HTML, JavaScript, CSS, and/or the like) from the web server 70 for presentation. For instance, a webpage may comprise an HMTL document comprising computer-executable program code with content (e.g., text, images and/or the like) for displaying the content based on presentation/styling information/data defined in CSS (e.g., font size, color, location on the screen and the like), for instance. As will be recognized, the received webpage document may define the webpage structure, content, and the styling/appearance of the webpage. The received webpage document may be in a plurality of languages. For instance, the content (e.g., text) may include HTML and the styling of the content may be in JavaScript and/or CSS. The internet browser executing on the user computing device 30 may be configured to interpret and display the received webpage document (e.g., by converting the webpage document into document object model (DOM) for display).

However, instead of simply interpreting and displaying the received webpage document, at step/operation 912 in FIG. 9A, the internet browser (e.g., via the internet browser extension or the user profile) may execute one or more scripts (e.g., via the internet browser extension or the user profile) to modify the received webpage document. The scripts allow the internet browser to add new HTML to the page; change existing content; modify styles; react to user actions; run on mouse clicks, pointer movements, and/or key presses; send requests over the network to remote servers; download and upload files; get and set cookies; ask questions to the visitor; show messages; and/or the like. For example, the one or more scripts may be executed by a scripting engine or virtual machine (e.g., V8, SpiderMonkey, Trident, Chakra, ChakraCore, Nitro, and SquirrelFish) in coordination with the internet browser extension or user profile to modify the received webpage document based at least in part on the stored program code entries. For example, the one or more scripts may be executed by a scripting engine or virtual machine in coordination with the internet browser extension or user profile to iterate from the beginning of the HTML document identified by the appropriate tag (<html>) and change each parameter, attribute, value, and/or the like as indicated by the current program code entries through the end of the HTML document identified by the appropriate tag (</html>). Similarly, the one or more scripts may be executed by a scripting engine or virtual machine in coordination with the internet browser extension or user profile to access and modify content objects, such as images, and replace pixels in the content objects as indicated by the current program code entries. In this regard, the one or more scripts may be executed by a scripting engine or virtual machine (e.g., V8, SpiderMonkey, Trident, Chakra, ChakraCore, Nitro, and SquirrelFish) in coordination with the internet browser extension or user profile to modify the webpage document, embedded content, and/or the like by replacing existing code, inserting additional code, and/or the like in the received webpage document. Changes to the webpage document may be universal (applying to all elements in the webpage documents) or may only affect elements with certain tags, classes, identifiers, and/or the like. By way of example, the received webpage may be modified by the one or more scripts executed by a scripting engine or virtual machine (in coordination with the internet browser extension or user profile) to, for example, replace all text styled red in the webpage document to text green. Similarly, all font size at or under a particular size may be modified (e.g., magnified or reduced in size). And further, the location of content objects may be similarly moved in the presentation of the received webpage document.

Continuing with the above example, as illustrated in FIG. 6A, the internet browser may receive a webpage document comprising computer-executable program code to display content (e.g., the text "UnitedHealthcare") as defined in the document (e.g., font size 8)—see browser instance 600 of FIG. 6A. The internet browser extension may modify the webpage document prior to interpretation and display/presentation to change all text that is too small for the user, who has presbyopia, to see clearly. The internet browser extension (or user profile) may provide a stored program code entry to appropriately modify the small text to the size specified by the current program code entry. The internet browser extension may, based at least in part on the program code entry, insert code into the received webpage document that finds all the text in the code smaller than font size 8 and modifies the text to font size 14 (e.g., generating a modified webpage document for display/presentation)—see browser instance 605 of FIG. 6B.

In another exemplary illustrated in FIG. 7A, the internet browser may receive a webpage document comprising computer-executable program code to display content (e.g., a hexagon) as defined in the document (e.g., styled red)—see browser instance 700 of FIG. 7A. The internet browser extension may modify the webpage document prior to interpretation and display/presentation to modify the color of the hexagon. The stored program code entry may comprise executable instructions for changing all red elements in the webpage document to green elements. The internet browser extension may, based at least in part on the program code entry, find all elements in the webpage document that are styled red and change those elements to green— see browser instance 605 of FIG. 6B.

FIGS. 10A-10B illustrate portions of code from an exemplary webpage document comprising computer-executable program code (e.g., HTML and/or CSS and the like). As shown, the webpage document code defines paragraphs starting with "<p>" and ending and "</p>". The style/formatting of the content in each paragraph is defined within the webpage document code. As shown, the portion of code in FIG. 10A defines a first paragraph with the text "This is text in a paragraph" styled red in font face/type verdana and font size 3 and a second paragraph with the text "This is text in a different paragraph" styled green in font face/type verdana and font size 6. Program code entries may be used to modify/replace portions of the code shown in FIG. 10A.

FIG. 10B illustrates the portion of code in FIG. 10A that has been modified based at least in part on stored program code entries. As shown, all red fonts have been styled green and all font sizes with a value below 10 have been replaced with font size 10.

At step/operation 914 in FIG. 9A, the user computing device 30 may present the modified webpage. Referring again to FIG. 6A-6B, small text "UnitedHealthcare" presented via the user interface 600 has been modified based at least in part on stored program code entries and is presented via the user interface 605. Referring to FIG. 7A-7B, the color of the hexagon presented via the user interface has been modified based at least in part on stored program code entries and is presented via the user interface 705. The internet browser may continue to modify all webpage documents transmitted from the web server 70 according to the stored program code entries until the internet browser session ends.

In an embodiment outside of the internet browser content, a system extension (e.g., operating system module) may perform similar steps/operations as one or more scripts to modify the display/presentation of output of the operating system and/or applications executing in coordination with the operating system. For example, the application server 65 may provide program code entries (based at least in part on program code identifiers) to programmatically modify display preferences/settings/options and/or display outputs. Thus, the user computing device 30 may use the system files and program code entries to modify the display/presentation of content in user interfaces executing on the user computing device 30.

e. Machine-Learning Driven Changes to Program Code Entries

In one embodiment, the internet browser (e.g., via the extension or user profile) may capture user interaction events (e.g., user interaction data) associated with the displays/presentations. User interaction events may be the user modifying or overriding user computing device 30 display/presentation preferences/settings/options and/or the internet browser display/presentation preferences/settings/options. For example, the user may make a variety of changes (e.g., user interaction events) to display/presentation preferences/settings/options, such as the resolution, browser zoom level, device display level, orientation, scaling, font face/type, font size, color format, color space, color settings, system color changes, and/or the like.

In step/operation 1101 of FIG. 11A, the computing device 30 and/or the internet browser may capture each user interaction event (e.g., change to display preferences/settings/options). The computing device 30 and/or the internet browser may store the same as user interaction information/data. The user interaction information/data for each user interaction event may indicate the time of interaction (e.g., via one or more timestamps), the context of the interaction (e.g., browser, app, or device preferences/settings/options), the type of the interaction (e.g., the specified change, such as changing an arial font to serif, or all font sizes to 12, and/or the like), and/or the like.

At step/operation, the computing device 30 and/or the internet browser can provide the user interaction information/data to the application server 65. The user interaction information/data may be provided to the application server 65 periodically, continuously, or in response to certain triggers. For example, the application server 65 may periodically poll the user computing device 30 for user interaction information/data. Similarly, the user computing device 30 and/or the internet browser can automatically provide user interaction information/data as part of the request for the current program code entries corresponding to the program code identifier (see step/operation 904 of FIG. 9A). As will be recognized, a variety of approaches and techniques can be used to adapt to various needs and circumstances.

At step/operation 1102 of FIG. 11B, the application server 65 can receive the user interaction information/data. In response to receipt, the application server 65 can determine whether the user interaction information/data satisfies a configurable event threshold for input into one or more machine learning models (step/operation 1104 of FIG. 11B). The configurable event threshold can be used as a mechanism to ensure that predictions for the user are based on sufficient user interaction information/data. The configurable event threshold may identify a minimum number of user interaction events that are required for input into the one or more machine learning models. Thus, if there is insufficient user interaction information/data, the application will perform step/operation 1102 of FIG. 11B once new user interaction information/data is received.

In one embodiment, the application server 65 formats the user interaction features, for example, into a multidimensional vector for input into the one or more machine learning models and provides the same as input to the one or more machine learning models (steps/operations 1106, 1108 of FIG. 11B). In a particular embodiment, the one or more machine learning models may be multi-class classification models. For example, the multi-class classification models can generate a prediction for each display/presentation preferences/settings/options. For instance, the one or more machine learning models may generate one prediction for a preferred font, one prediction for a preferred font size, one prediction for a preferred zoom level, one prediction for a preferred contrast setting, and/or the like. Thus, the output may be a predicted preferred display/presentation preferences/settings/options and corresponding confidence scores.

As will be recognized, to achieve these results, a variety of machine learning libraries and algorithms can be used to implement embodiments of the present invention. For example, neural networks, Extreme Learning Machines (ELM), k-nearest neighbor, Naive Bayes, decision trees, support vector machines, and/or various other machine learning techniques can be used to adapt to different needs and circumstances. In one embodiment, the machine learning models (e.g., multi-class classification models) may be pluggable machine learning models.

As noted above, the predicted output (e.g., generated prediction) of the one or more machine learning models for a given user may be a plurality of predictions and corresponding confidence scores. Exemplary outputs for a user are provided below for a predicted preferred font face/type and a predicted preferred font size.

| Program Code Identifier 1807a66aff684ef3accfaa3278ce1ccd |
| --- |
| Font face/type: serif |
| Font face/type: .86 |
| Font size: 18 |
| Font size: .27 |

As will be recognized from the above, in this example, the program code identifier is unique to the user. Thus, the program code identifier uniquely identifies the user and his or her program code entries.

At step/operation 1110 of FIG. 11B, the application server 65 can determine whether each predicted output (e.g., each prediction) satisfies a configurable prediction threshold. The configurable prediction threshold can be used as a mechanism to ensure that predictions for the user satisfy a defined confidence (e.g., confidence level) in the prediction. For example, the configurable prediction threshold may be 0.83 to ensure the user has a positive experience without his or her display/presentation preferences/settings/options being changed, unless there is a high likelihood of accuracy. If the configurable prediction threshold is not satisfied, this process ends. However, if the configurable prediction threshold is satisfied, this process continues to step/operation 1112 of FIG. 11B. The application server 65 can iterate through a determination for each predicted output.

At step/operation 1112 of FIG. 11B, for each predicted output that satisfies the configurable prediction threshold, the application server 65 can identify the corresponding code entries for the predicted output. For instance, if the font type prediction of serif has a confidence score of 0.86, the application server 65 would then identify the program code entry to adjust a particular font type display/presentation preference/setting/option to serif. This may be a default setting for an entire display, a setting to change arial to serif, to change font sizes in 18 to serif, and/or the like. As will be recognized, a variety of approaches and techniques can be used to adapt to various needs and circumstances.

At step/operation 1114 of FIG. 11B, the application server 65 can store the program code identifier in association with the program code entries or the program code entries in association with the program code identifier. This allows for the program code entries to correspond to the predicted outputs satisfying the configurable prediction threshold. With program code entries updated to reflect the predicted outputs satisfying the configurable prediction threshold, the application server 65 can return to steps/operations 814, 816 of FIG. 8A. This allows the application server 65 to provide the "predicted" program code entries to the user computing device 30 and/or the internet browser. As will be recognized, a variety of other approaches and techniques can be used to adapt to various needs and circumstances.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only, and not for purposes of limitation.

The invention claimed is:

1. A computer-implemented method comprising:
   identifying, by one or more processors, one or more program code entries that are configured to, upon execution, dynamically modify display settings of a user interface;
   receiving, by the one or more processors, user interaction data (a) associated with operation of the user interface on a computing device and (b) representing a plurality of user interactions with the user interface;
   modifying, by the one or more processors and using one or more machine learning models, at least one of the one or more program code entries based on the plurality of user interactions of the user interaction data satisfying a predetermined number of user interactions; and
   transmitting, by the one or more processors and to the computing device, the modified at least one of the one or more program code entries.

2. The computer-implemented method of claim 1, wherein the modifying comprises:
   formatting, by the one or more processors, the user interaction data into a multidimensional vector for input into the one or more machine learning models.

3. A computer program product comprising a non-transitory computer readable medium having computer program instructions stored therein, the computer program instructions when executed by one or more processors, cause the one or more processors to:

identify one or more program code entries that are configured to, upon execution, dynamically modify display settings of a user interface;

receive user interaction data (a) associated with operation of the user interface on a computing device and (b) representing a plurality of user interactions with the user interface;

modifying, using one or more machine learning models, at least one of the one or more program code entries based on the plurality of user interactions of the user interaction data satisfying a predetermined number of user interactions; and transmitting, to the computing device, the modified at least one of the one or more program code entries.

4. The computer program product of claim 3, wherein the modifying comprises:

formatting, by the one or more processors, the user interaction data into a multidimensional vector for input into the one or more machine learning models.

5. A system storing computer program instructions that when executed by one or more processors of the system, cause the system to:

identify one or more program code entries that are configured to, upon execution, dynamically modify display settings of a user interface;

receive user interaction data (a) associated with operation of the user interface on a computing device and (b) representing a plurality of user interactions with the user interface;

modifying, using one or more machine learning models, at least one of the one or more program code entries based on the plurality of user interactions of the user interaction data satisfying a predetermined number of user interactions; and transmitting, to the computing device, the modified at least one of the one or more program code entries.

6. The system of claim 5, wherein the modifying comprises:

formatting, by the one or more processors, the user interaction data into a multidimensional vector for input into the one or more machine learning models.

\* \* \* \* \*